Aug. 14, 1928.
E. J. LAUGAUDIN
1,680,890
PNEUMATIC SUSPENSION DEVICE FOR VEHICLES
Filed June 7, 1926   2 Sheets-Sheet 1
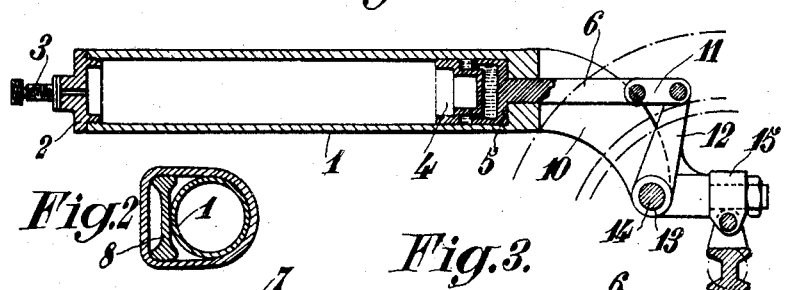
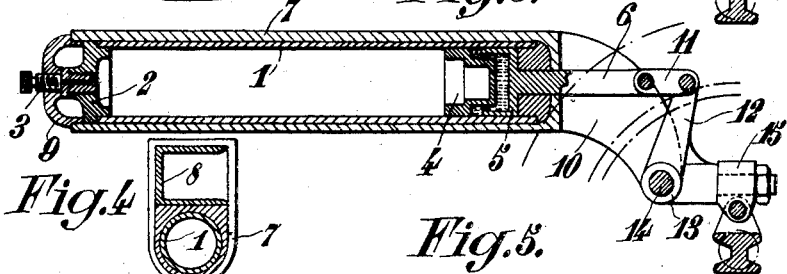
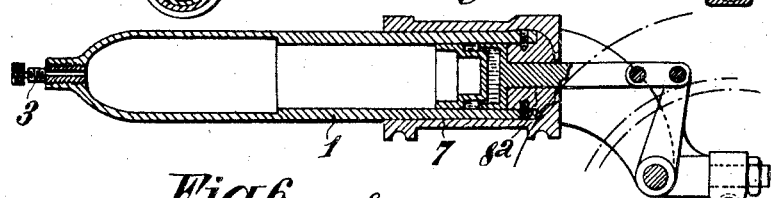
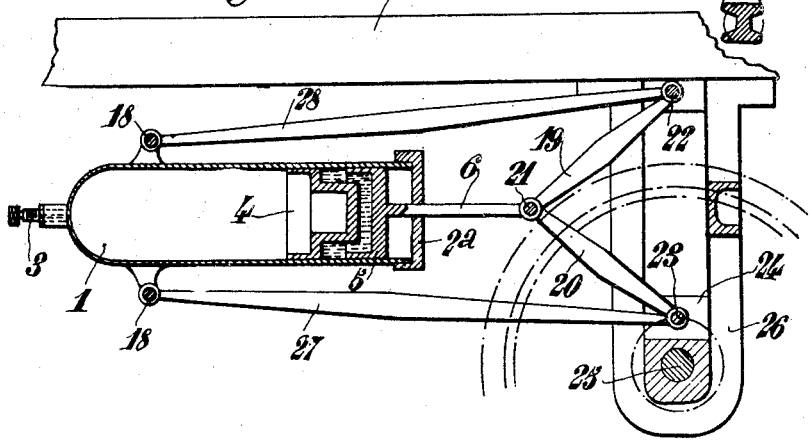
E. J. Laugaudin
INVENTOR
By: Marks & Clark
Attys.

Aug. 14, 1928.  E. J. LAUGAUDIN  1,680,890
PNEUMATIC SUSPENSION DEVICE FOR VEHICLES
Filed June 7, 1926   2 Sheets-Sheet 2

E. J. Laugaudin
INVENTOR

By Marks & Clerk
Attys.

Patented Aug. 14, 1928.

1,680,890

UNITED STATES PATENT OFFICE.

EUGÈNE JULES LAUGAUDIN, OF PARIS, FRANCE.

PNEUMATIC SUSPENSION DEVICE FOR VEHICLES.

Application filed June 7, 1926, Serial No. 114,277, and in France June 13, 1925.

The present invention relates to a pneumatic suspension device adapted for use with and to some extent replace the springs and other devices at present in use.

The device according to the invention is applicable to vehicles of all types and in particular to tramways, motorcycles, automobiles, railway carriages; it may also be employed for the landing device and skid in aeroplanes.

The said suspension device which makes use of the elasticity of gases is illustrated by way of example in the accompanying drawings, in which:

Figure 1 shows the suspension device in longitudinal section.

Figure 2 is a cross section about halfway along the cylinder in Figure 1 showing the attachment upon the chassis of a vehicle.

Figure 3 shows a modification and

Figure 4 its attachment to the chassis.

Figure 5 is another modified form of construction in longitudinal section and in cross section.

Figure 6 shows a method of mounting the cylinder for certain applications.

Figure 7:
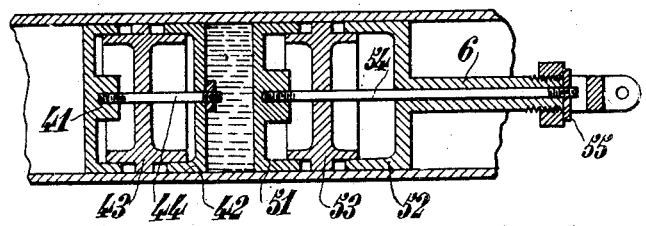

Figure 7 shows a modified form of construction.

Figure 8:
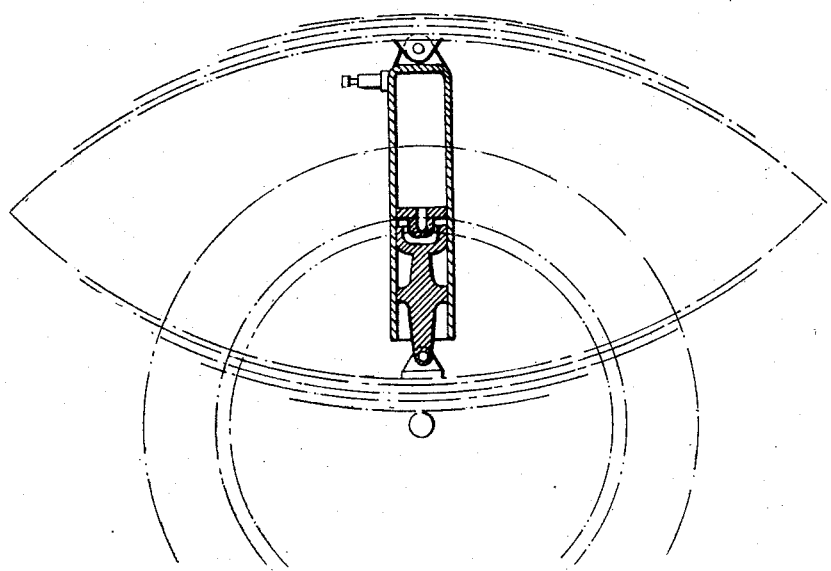

Figure 8 shows the device employed as a shock absorber.

As shown in the drawings in Figure 1 the said suspension device is composed essentially of a cylinder or pump body 1 open at both ends, one opening being closed by a plug 2 producing a fluid tight joint. The said plug may be screwed or fitted upon the cylinder in any suitable manner.

Upon this plug is disposed a valve 3 after the nature of a tire valve, permitting air or any other gas to be compressed in the interior of the cylinder.

This gas may be compressed in such a way as to have a suitable pressure. (2, 3 kilogrammes or more).

In the interior of the cylinder 1 is interposed a loose piston 4 and in front of the latter a piston 5 terminating in a rod 6 passing through the breech or opening of the cylinder. These pistons are preferably given the form shown in the drawings so that they are adapted to slide and telescope one within the other.

The space comprised between the two pistons 4 and 5 is filled with a liquid producing fluid tightness (oil, glycerine or the like) and when there is any loss of this liquid in said space there is a relative displacement of the piston 4 within piston 5. The said cylinder thus forms a sort of bottle or flask which is removable and interchangeable.

The cylinder 1 is provided with an extension 10 in the form of a swan neck.

The piston rod 6 is connected by means of a link 11 to a right angled lever 12 pivotally mounted at its apex at 13 upon a pin 14 mounted upon the end of the swan neck 10.

The other branch of the right angled lever forming a ball and socket or universal joint is mounted in a bearing 15 keyed upon the axle upon which the wheel of the vehicle is mounted.

The operation of the apparatus will be clear from a simple study of the drawings.

The displacement of the angle lever 12 transmits the shocks received by the wheel or axle to the piston 5 through the medium of the link 11; the piston, in moving in the cylinder 1 increases the compression of the gas contained in this cylinder; and as soon as the shock which has given rise to the compression has been absorbed the gas expands and pushes the piston towards the end of the cylinder.

The angle lever transmits the shocks to the piston much more powerfully as the axle is moved further away from the pivotal point of connection 14; this arrangement enabling, concurrently with the initial pressure of the gas in the cylinder, the suspension device to be adjusted according to the weight of the vehicle or the bad state of the road.

It will therefore be understood that as the cylinder 1 is removable and interchangeable together with its two pistons and its closing plug, the bottle thus formed may be easily replaced on the road by another spare one in the case for example when the pressure in one has become insufficient and it is not desired to increase it with the aid of a pump, or else in the event of more serious damage, wear or leakage. This constitutes a very important feature of the invention.

Figure 2 shows the method of attaching the bottle along the chassis 8 of the vehicle.

In the modification shown in Figure 3 the bottle is placed in a cylinder 7 fixed horizontally along and beneath the chassis 8 of the vehicle by means of straps or any other suitable means. In this case the swan neck 10 is no longer integrally secured to the tube 1 but to the cylinder 7.

A plug 9 closes the cylinder 7, holding the bottle 1 in place, the said plug being provided if desired with an aperture for the passage of the valve 3.

In the modification shown in Figure 5 the cylinder 7 is shorter and does not extend over the whole length of the tube 1; the bottle is made virtually integral with this cylinder by any suitable means.

In the modification shown in Figure 6 another method of mounting the bottle is shown; in this modification the axle can only move in a vertical plane.

For this purpose the bottle 1 is provided with a collar suitably attached or simply lugs 18 secured to the said bottle; the rod 6 of the piston 5 is connected to two lever arms 19 and 20 pivotally mounted on the one hand upon the end of the rod 6 at 21 and on the other hand, for the lever 9, at a fixed point 22, and for the lever 20 at 23 to a bearing 24 movably disposed upon the axle 25 moving in a stirrup forming a slideway secured to the chassis 8; further, rods 27, 28 connect the lugs 18 to the pivotal points 22 and 23.

It will be understood that when the axle receives a shock the system formed by 19, 20, 27 and 28 is deformed pushing back the whole of the piston 5 and 4, but the axle makes no other movement except in a vertical direction.

Figure 7 shows a modified constructional form of the bottle. The two original pistons 4 and 5 are replaced by groups of two pistons 41—42 and 51—52 as shown in the drawings; between each of these two groups is arranged a third piston 43—53 engaging in the two pistons and provided with a circular rib having the internal diameter of the bottle; a bolt 44 forms the connection between the three parts 41, 42 and 43.

The space comprised between the rib and the extreme edge of the pistons is filled with a suitable material in order to produce perfect fluid-tightness and to obviate as much as possible the necessity for employing any joints or packing rings.

A similar device is provided for the group of pistons 51—52—53 but the rod 6 is pierced so as to allow the shank of the bolt 54 to pass; a nut 55 enables the connection between the parts 51, 52 and 53 to be obtained and the spacing apart of the pistons 51 and 52 in order to produce a good fluid tight joint to be adjusted from outside the bottle.

In the example shown in Figure 8 the suspension device is adapted to serve in conjunction with suspension springs; it is arranged vertically between the leaves of a double spring or in the case of a single spring between the latter and the chassis, and so on.

For railways and tramways the elastic energy may be supplied by the boiler or the compressed air of the brake.

The various cylinders of one and the same vehicle may naturally be supplied from one and the same reservoir, a suitable pipe system with cocks and a manometer enabling the pressure in the bottle to be increased or reduced according to the load carried.

Finally, this suspension by means of a removable and interchangeable bottle or flask may also be employed for the suspension of the forks of motorcycles.

What I claim is:

1. A pneumatic suspension device for vehicles, including aircraft comprising a removable and interchangeable cylinder or bottle, supporting means for same, a pump valve fitted to the cylinder enabling the device to work with gas under pressure, a piston rod and means for transmitting to the piston rod displacements of the vehicle wheels caused by road irregularities and the like in combination with a loose piston in said cylinder, a second piston in front of the loose piston and connected to the piston rod, and an oily fluid substance in the space between the two pistons forming a gas tight joint.

2. A pneumatic suspension device as claimed in claim 1, in which the means for transmitting the displacement of the wheels to the piston rod comprises a bell-crank lever, connecting means between one arm thereof and the piston rod and a universal joint between the other arm and the wheel axle.

3. A pneumatic suspension device as claimed in claim 1, in which the two pistons are adapted to telescope one within the other.

In testimony whereof I have signed my name to this specification.

EUGÈNE JULES LAUGAUDIN.